United States Patent
Koplar

(10) Patent No.: US 10,780,353 B2
(45) Date of Patent: Sep. 22, 2020

(54) METHODS AND SYSTEMS FOR PROCESSING GAMING DATA

(71) Applicant: Koplar Interactive Systems International, LLC, St. Louis, MO (US)

(72) Inventor: Edward J. Koplar, St. Louis, MO (US)

(73) Assignee: KOPLAR INTERACTIVE SYSTEMS INTERNATIONAL, LLC, St. Louis, MO (US)

( * ) Notice: Subject to any disclaimer, the term of this patent is extended or adjusted under 35 U.S.C. 154(b) by 0 days.

(21) Appl. No.: 16/244,334

(22) Filed: Jan. 10, 2019

(65) Prior Publication Data

US 2019/0143220 A1 May 16, 2019

Related U.S. Application Data

(63) Continuation of application No. 15/833,659, filed on Dec. 6, 2017, now Pat. No. 10,213,695, which is a continuation of application No. 15/145,350, filed on May 3, 2016, now Pat. No. 9,873,053, which is a continuation-in-part of application No. 14/223,389, filed on Mar. 24, 2014, now Pat. No. 9,352,228, which is a continuation of application No. 12/487,168, filed on Jun. 18, 2009, now Pat. No. 8,715,083.

(51) Int. Cl.
*A63F 13/77* (2014.01)
*H04N 21/43* (2011.01)
*H04N 21/478* (2011.01)
*A63F 13/92* (2014.01)

(52) U.S. Cl.
CPC .......... *A63F 13/77* (2014.09); *H04N 21/4307* (2013.01); *H04N 21/4781* (2013.01); *A63F 13/92* (2014.09); *A63F 2300/204* (2013.01); *A63F 2300/5506* (2013.01); *A63F 2300/8064* (2013.01)

(58) Field of Classification Search
CPC .. A63F 13/77; A63F 13/92; A63F 2300/8064; A63F 2300/5506; A63F 2300/204; H04N 21/4781; H04N 21/4307
See application file for complete search history.

(56) References Cited

PUBLICATIONS

Thomas Ricker, "OnLive killed the game console star?" Mar. 24, 2009, engadget, https://www.engadget.com/2009/03/24/onlive-killed-the-game-console-star/#/ (Year: 2009).*

* cited by examiner

*Primary Examiner* — Kevin Y Kim
(74) *Attorney, Agent, or Firm* — Christopher R. Carroll; The Small Patent Law Group LLC

(57) ABSTRACT

Methods and systems for content processing are described. In one embodiment, gaming data is received from a gaming source server. The gaming data associated with a game. A content signal is received from a signal source during presentation of programming content. The programming content is associated with the content signal and the game. A determination of whether the content signal includes the trigger is made. The device content is presented using the gaming data. The device content is in synchronization with the presentation of the programming content based on a determination that the content signal includes a trigger. Additional methods and systems are disclosed.

20 Claims, 5 Drawing Sheets

METHODS AND SYSTEMS FOR PROCESSING GAMING DATA

CROSS-REFERENCE TO RELATED APPLICATIONS

This application is a continuation of U.S. patent application Ser. No. 15/833,659 (filed 6 Dec. 2017), which is a continuation-in-part of U.S. patent application Ser. No. 15/145,350 (now U.S. Pat. No. 9,873,053, filed 3 May 2016), which is a continuation-in-part of U.S. patent application Ser. No. 14/223,389 (now U.S. Pat. No. 9,352,228, filed 24 Mar. 2014), which is a continuation of U.S. patent application Ser. No. 12/487,168 (now U.S. Pat. No. 8,715,083, filed 18 Jun. 2009). The entire disclosures of these patent applications are incorporated herein by reference.

FIELD

The present application relates generally to the technical field of information processing. In one specific example, the present application relates to methods and systems for processing gaming data.

BACKGROUND

A user interacts with controls on a video game unit or other hand-held device to play a video game for entertainment purposes. The user may connect with other users of a network to participate jointly in a game, or the user may be a sole participant in the game.

DETAILED DESCRIPTION

Example methods and systems for processing gaming data are described. In the following description, for purposes of explanation, numerous specific details are set forth in order to provide a thorough understanding of example embodiments. It will be evident, however, to one of ordinary skill in the art that embodiments of the invention may be practiced without these specific details.

In some embodiments, a hand-held device receives gaming data associated with a gaming application. The hand-held device receives a content signal displayed or otherwise reproduced during presentation of programming content. Device content is presented on the hand-held device using gaming data synchronously with the presentation of the programming content based on a determination that the content signal includes a trigger.

The gaming data that has been received by the hand-held device may include puzzle data, map data, character data, weapon data, or any other data that may enhance or otherwise alter game play of the gaming application. The received gaming data may enhance the game play. For example, a new puzzle received as a portion of the gaming data may only become available when a television show that corresponds to the puzzle is aired on a television network.

Figure 1:
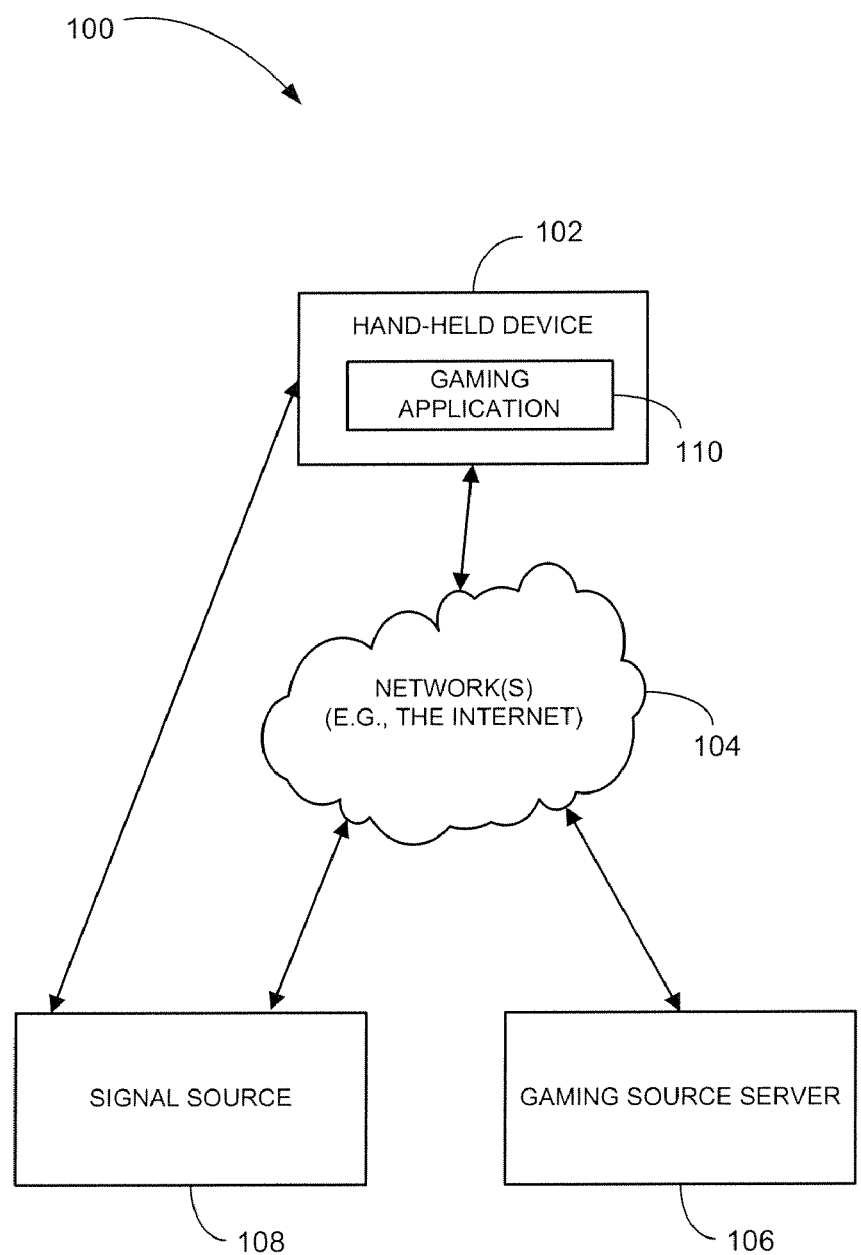
FIG. 1 is a block diagram of an example content processing system, according to an example embodiment.

FIG. 1 illustrates an example content processing system 100 in which a hand-held device 102 receives gaming data from a gaming source server 106 and a content signal from a signal source 108 and uses the received information to present device content on the hand-held device 102.

The hand-held device 102 is a portable gaming device, a personal digital assistant (PDA), a mobile telephone, a smart card, a portable computer, or the like. Other types of hand-held devices may also be used. In an example embodiment, the hand-held device 102 may include a CMOS imaging sensor, a 32-bit microprocessor and external memory. For example, the hardware of the hand-held device 102 may include OEM part number: 5080SR-1212A0R by Honeywell Imaging and Mobility, a color CMOS imaging device (e.g., the Omni Vision OV7670) and a 32-bit microcontroller (e.g., the Sunplus SPG293A).

A gaming application 110 is deployed on the hand-held device 102 and interacts with programming content (e.g. a game show) presented by the signal source 108. The gaming application 110 is a user interactive game that displays content on a display screen of the hand-held device 102 and may make sounds, vibration, and/or other interaction with the user to enable a user to "participate" or "interact" with the programming content. The programming content presented on the signal source 108 is ordinary programming content that other viewers or listeners may watch or listen without participating. The gaming application 110 may be a game of skill or luck, may involve a sweepstakes, and/or may involve performing one or more activities to enable a user of the hand-held device 102 to receive a promotional opportunity. In one embodiment, the user cannot interact with the gaming application 110 without watching or listening to the programming content. By watching or listening to the programming content, the user receives a content signal that includes a trigger to synchronize the gaming application 110 to the programming content and knows the opportunities to interact on the hand-held device with the programming content. For example, the programming content may include questions that the participants shown or heard on the programming content answer. A user operating the hand-held device 102 may answer the questions asked on the programming content by interacting with the gaming application 110. By answering the questions, the user may accumulate points that are redeemable for a prize.

Device content is presented on a display of the hand-held device 102 as one or more display screens of the gaming application 110. The information received by the hand-held device 102 and processed by the gaming application 110 may alter the presentation of the display screens, or the display screens may be presented solely based on the received information. Examples of the gaming application 110 are play along or home play versions of WHO WANTS TO BE A MILLIONAIRE and ARE YOU SMARTER THAN A FIFTH GRADER that may be played along with corresponding programming content (e.g., answering questions that are asked during ordinary episodes of the programming content). Other types of play along and non-play along gaming application may also be included.

A network 104 over which the hand-held device 102 is in communication with the gaming source server 106, the signal source 108, or both may include a Global System for Mobile Communications (GSM) network, a code division multiple access (CDMA) network, 3rd Generation Partnership Project (3GPP), an Internet Protocol (IP) network, a Wireless Application Protocol (WAP) network, a WiFi network, or an IEEE 802.11 standards network, as well as various combinations thereof. For example, the hand-held device 102 may be in communication with the gaming source server 106 through a first network, and may be in communication with a signal source 108 through a second, different network. Other conventional and/or later developed wired and wireless networks may also be used.

The gaming source server 106 is a computing device that transmits gaming data over the network 104 to the hand-held device 102. The gaming data may be provided by the gaming source server 106 on demand, through syndication, or may be otherwise provided. For example, the gaming data may be downloaded or otherwise communicated from the gaming source server 106 to the hand-held device 102 prior to presentation of the programming content, or at least prior to presentation of a portion of the programming content to which the gaming application (using the gaming data) is synchronized. This can be helpful to ensure that the gaming data is available on the hand-held device 102 when needed during the programming content (e.g., upon or responsive to detection of a trigger in the programming content). Alternatively, the gaming data may not be downloaded or otherwise communicated to the hand-held device until the trigger in the programming content is detected. For example, upon or responsive to detection of the trigger, the hand-held device 102 may then obtain the gaming data. In some embodiments, the gaming source server 106 may be implemented as part of an existing server. For example, the gaming source server 106 may be integrated into APPLE ITUNES. In some embodiments, the gaming source server 106 may transmit one or more gaming application 110 to the hand-held device 102.

The gaming source server 106 may interact with the hand-held device 102 over the network 104 to provide gaming data, track scores of various users, provide electronic coupons, and the like. For example, a score or other performance indicator may be sent over the network 104 from the hand-held device 102 to the gaming source server 106. The gaming source server 106 may be associated with the game being presented on the signal source 108.

The signal source 108 is an electronic device that is capable of providing a content signal. The content signal may be directly received by the hand-held device 102, or may be received through the network 104. The signal source 108 may be located, by way of example, in the user's home or at a business. Examples of the signal source 108 include a display device, an audio reproduction device, or the like. The signal source 108 may receive the content signals from a television broadcast station, over the network 104, from a DVD, from local storage, or may otherwise be received. The content signals may include an encoded audio signal, an encoded video signal, or a different type of content signal. The audio signal may be encoded with RDS or otherwise encoded. The gaming source server 106 may be affiliated with the provider of content signals of the signal source 108. Promotional or other data may be enabled through use of the hand-held device 102 based on a presentation being made on the signal source 108.

One or more signal sources 108 may be used. For example, the source media 106 may be read from a first signal source 108, and the synchronization data may be received from a second signal source 108.

In an example embodiment of when the gaming application 110 is used in the system 100, the gaming application is played in conjunction with programming content displayed by the signal source 108. The gaming data that relates to a television show, a radio program, or other presentation of content is downloaded or otherwise received from the gaming source server 106. The gaming data is synchronized with the "live" broadcast of the televised or radio event by an audible or inaudible trigger to activate "live" game play on the hand-held device 102. The device content or other device activity is then presented or performed on the hand-held device 102 based on the synchronization of the gaming data using the trigger.

Figure 2:
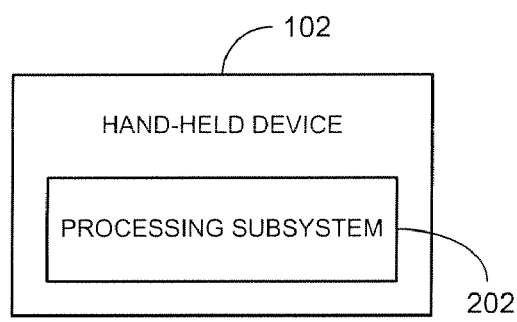
FIG. 2 is a block diagram of an example hand-held device that may be deployed within the system of FIG. 1, according to an example embodiment.

FIG. 2 illustrates an example hand-held device 102, according to an example embodiment. The hand-held device 102 is shown to include a processing subsystem 202. The processing subsystem 202 presents device content on the hand-held device 102 based on gaming data and/or triggers received. The hand-held device 102 with the processing subsystem 202 may be deployed in the systems 100, 200, or may be deployed in another system.

Figure 3:
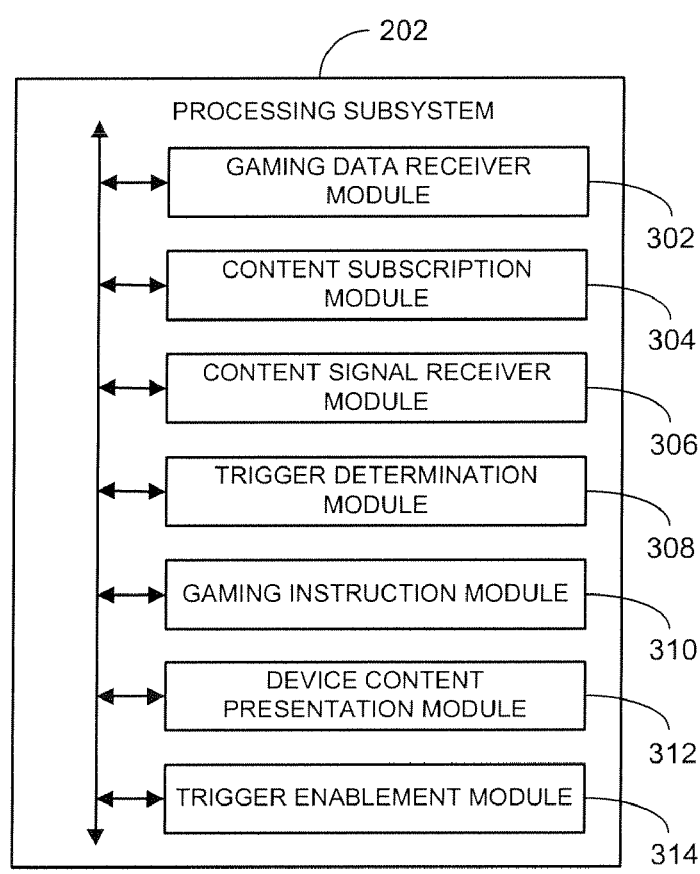
FIG. 3 is a block diagram of an example processing subsystem that may be deployed within the mobile electronic device of FIG. 1, according to an example embodiment.

FIG. 3 illustrates an example processing subsystem 202 that may be deployed in the hand-held device 102, or otherwise deployed in another system. One or more modules are communicatively coupled and included in the processing subsystem 202 to processing of gaming data. The modules of the processing subsystem 202 that may be included are a gaming data receiver module 302, a content subscription module 304, a content signal receiver module 306, a trigger determination module 308, a gaming instruction module 310, a device content presentation module 312, and a trigger enablement module 314. Other modules may also be included.

The gaming data receiver module 302 receives gaming data from the gaming source server 106. In some embodiments, the content subscription module 304 subscribes to a content subscription service with the gaming source server 106. The gaming data is then received based on the subscription.

The content signal receiver module 306 receives the content signal from the signal source 108 during presentation of programming content. The programming content may be presented by the signal source 108 receiving and reproducing the content signal.

The programming content is associated with the gaming application 110. For example, the programming content may be an episode of ARE YOU SMARTER THAN A FIFTH GRADER, the content signal may include the programming content, and the game may be a play along game with the episode.

The trigger determination module 308 determines whether the content signal includes a trigger. The content signal may include one or more triggers that are used to synchronize the presentation of the programming content with the game. When multiple triggers are used, the triggers may all include the same information or may have different information to activate a different response (e.g., different displays on the hand-held device 102). In some embodiments, the synchronization enables a user to play along or interact with programming content presented by the signal source 108.

In some embodiments, the processing subsystem 300 includes the gaming instruction module 310 to receive and process gaming instructions during presentation of the programming content and game play of the game. The gaming instructions are users' interactions that are associated with play of the game. For example, the gaming instructions may include selection of an answer among multiple choices, a string of characters associated with an answer, character movement, or the like.

The device content presentation module 312 presents device content using the gaming data based on a determination that the content signal includes the trigger. For example, several different displays may be presented on the hand-held device 102 after the trigger is received. The different displays may ask include questions or request other game instructions from the user. By receiving one or more triggers, the different displays may be provided to a user of the hand-held device 102 in real-time or otherwise in coordination with the presentation of the programming content. In some embodiments, the device content is presented based on the determination that the content signal includes the trigger and processing of one or more gaming instructions. For example, a screen may notify the user of the hand-held device of points earned based on gaming instructions received from the user. In some embodiments, the trigger itself does not provide data that is used as part of the device content.

The enablement module 314 enables further game play of the game and/or a promotional opportunity based on a determination that the content signal includes the trigger. The further game play or promotional opportunity, in some embodiments, is reflected on one or more displays of the gaming application 110. Further game play may include extended and/or enhanced play of the gaming application 110. The promotional opportunity may include points, credits, electronic coupons, additional gaming opportunities, or the like. The promotional opportunity may be available on the hand-held device 102, or may be available after enablement on a remote site (e.g., the gaming source server 106).

Figure 4:
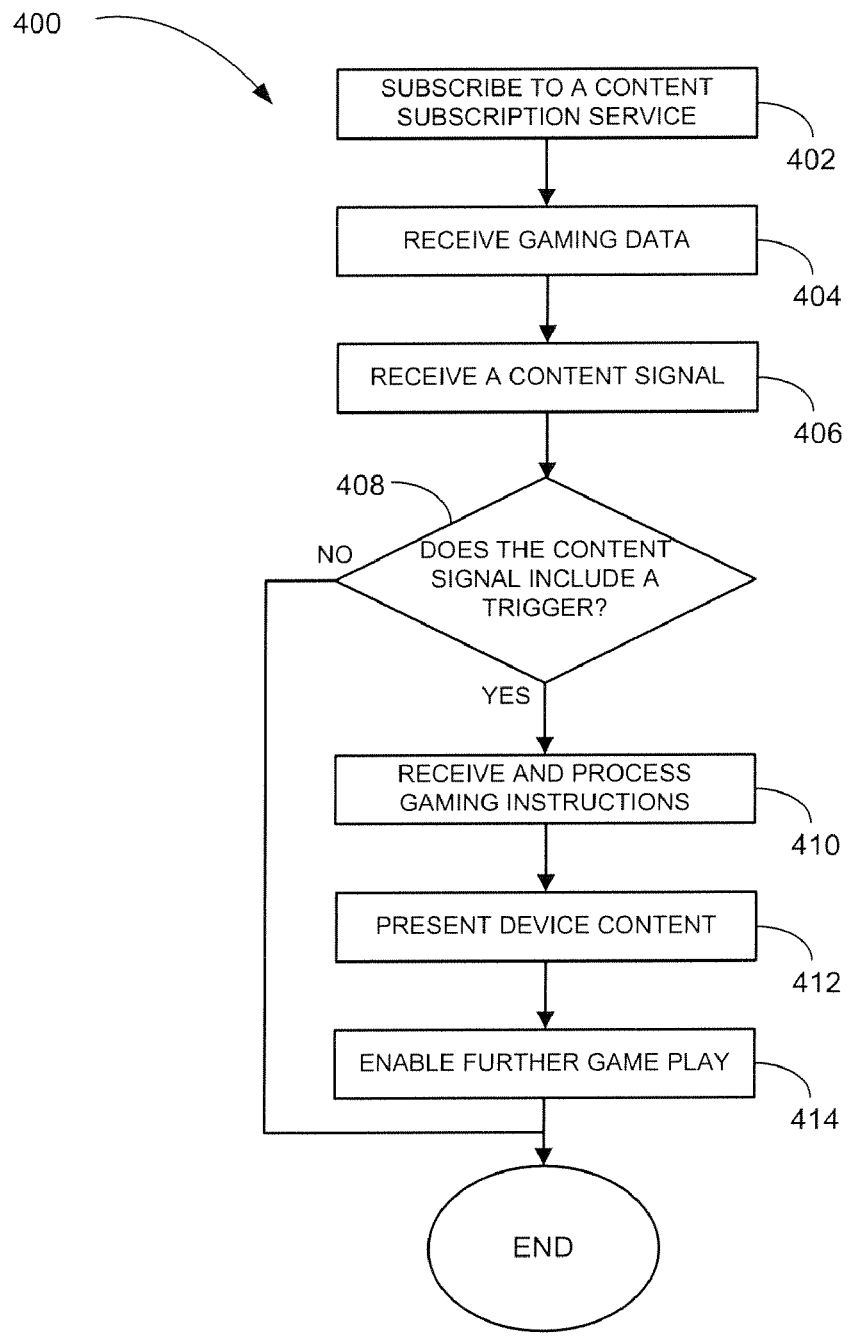
FIG. 4 is a block diagram of a flowchart illustrating method for processing gaming data, according to an example embodiment.

FIG. 4 illustrates a method 400 for processing gaming data to an example embodiment. The method 400 may be performed by the hand-held device 102 of the system 100 (see FIG. 1), or may be otherwise performed.

In some embodiment, a content subscription service with the gaming source server 106 is subscribed at block 402.

Gaming data is received from the gaming source server 106 at block 404. When a content subscription is used, the gaming data may be received at block 404 from the gaming source server 106 in accordance with the content subscription. The content subscription may be a Really Simple Syndication (RSS) feed, other types of web syndication, or another type of content subscription.

The content signal is received from the signal source 108 during presentation of programming content at block 406. The content signal may be a video signal (e.g. with our without an audio component) or an audio signal.

A determination of whether the content signal includes the trigger is made at decision block 408. The trigger may be an audio signal or a video signal. In some embodiments, the trigger is embedded in the video signal to be substantially invisible to an ordinary viewer of the presentation during the presentation of the programming content. For example, the trigger may be modulated in an active portion of the video signal. In other embodiments, the trigger is embedded in the audio signal (or audio component of the video signal) substantially inaudible to an ordinary listener of the presentation during the presentation of the programming content. For example, the trigger may be embedded in the audio signal with echo modulation. In other embodiments, the trigger is visible and/or audible.

In some embodiments, the determination performed at block 408 may further include determining whether the gaming data is associated with the gaming application 110. For example, the gaming data may be for a specific type of gaming application 110, or may be intended for one or more particular hand-held devices of all distributed hand-held devices (e.g., as a sweepstakes). The trigger may, in some embodiments, be matched with the gaming data during the operations performed at block 408 as part of the determination.

In some embodiments, additional identifying information (e.g., episode identifiers) may be included in the gaming data and/or along with or as part of the trigger to enable the receipt of the trigger to synchronize the gaming data for presentation as part of the device content.

If a determination is made that the content signal does not include the trigger, the method 400 may terminate. If a determination is made that the content signal includes the trigger, the method 400 may proceed to block 410 or block 412.

In some embodiments, gaming instructions are received and processed during the presentation of the programming content and the game play of the game at block 410.

At block 412, device content is presented using the gaming data based on a determination that the content signal includes the trigger. In some embodiments, the device content is presented using the gaming data based on the determination that the content signal includes the trigger and the processing of one or more gaming instructions.

In some embodiments, the presentation of the device content relies on the synchronization of the programming content using the trigger. For example, the programming content may describe a question, and the device content may provide the user of the hand-held device 102 with the available answers to the question. In another example, the programming content may describe an answer, and the device content may prompt the user to enter in the question.

In some embodiments, further game play of the game is enabled at block 414 based on a determination that the content signal includes the trigger. In some embodiments, the promotional opportunity is enabled at block 414 based on a determination that the content signal includes the trigger. The promotional opportunity may be received from and/or redeemed with a device (e.g., the signal source server 106) through the network 104, or promotional opportunity may be redeemed by physically taking the hand-held device 102 into a store for redemption.

In some embodiments, the game play of the game and the further game play of the game occur in real-time during the presentation of the programming content.

Figure 5:
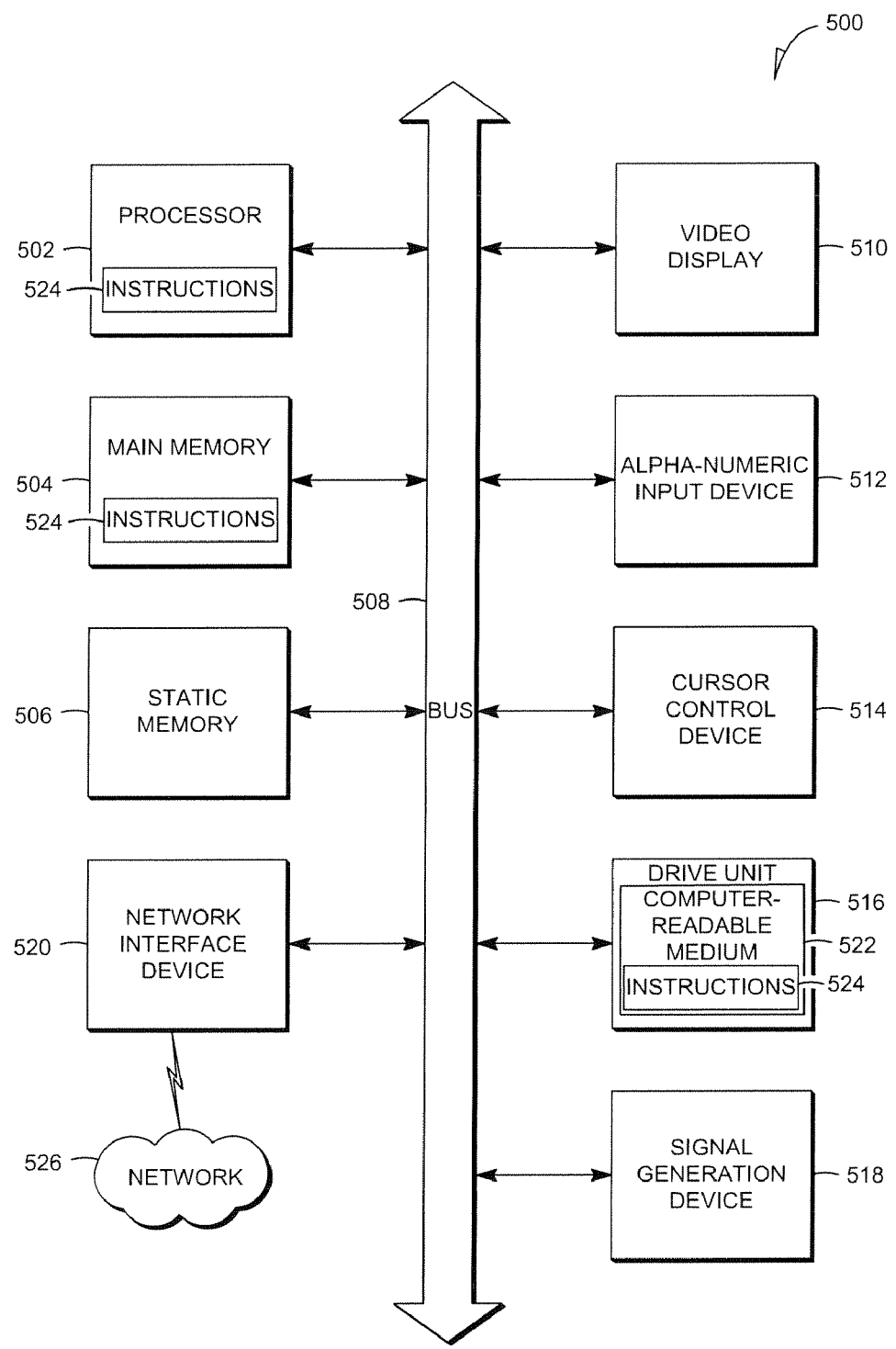
FIG. 5 is a block diagram of a machine in the example form of a computer system within which a set of instructions for causing the machine to perform any one or more of the methodologies discussed herein may be executed.

FIG. 5 shows a block diagram of a machine in the example form of a computer system 500 within which a set of instructions may be executed causing the machine to perform any one or more of the methods, processes, operations, or methodologies discussed herein. The hand-held device 102 may include the functionality of the one or more computer systems 500. The gaming source server 106, the signal source 108, or both may include the functionality of the one or more computer systems 500.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 512 (e.g., a central processing unit (CPU) a graphics processing unit (GPU) or both), a main memory 504 and a static memory 506, which communicate with each other via a bus 508. The computer system 500 may further include a video display unit 150 (e.g., a liquid crystal display (LCD) or a cathode ray tube (CRT)). The computer system 500 also includes an alphanumeric input device 512 (e.g., a keyboard), a cursor control device 514 (e.g., a mouse), a drive unit 516, a signal generation device 518 (e.g., a speaker) and a network interface device 520.

The drive unit 516 includes a machine-readable medium 522 on which is stored one or more sets of instructions (e.g., software 524) embodying any one or more of the methodologies or functions described herein. The software 524 may also reside, completely or at least partially, within the main memory 504 and/or within the processor 512 during execution thereof by the computer system 500, the main memory 504 and the processor 512 also constituting machine-readable media.

The software 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing or encoding a set of instructions for execution by the machine and that cause the machine to perform any one or more of the methodologies of the present invention. The term "machine-readable medium" shall accordingly be taken to include, but not be limited to, solid-state memories, and optical media, and magnetic media.

Certain systems, apparatus, applications or processes are described herein as including a number of modules. A module may be a unit of distinct functionality that may be presented in software, hardware, or combinations thereof. When the functionality of a module is performed in any part through software, the module includes a machine-readable medium. The modules may be regarded as being communicatively coupled.

The inventive subject matter may be represented in a variety of different embodiments of which there are many possible permutations. In an example embodiment, gaming data is received from a gaming source server. The gaming data associated with a game. A content signal is received from a signal source during presentation of programming content. The programming content is associated with the content signal and the game. A determination of whether the content signal includes the trigger is made. The device content is presented using the gaming data. The device content is in synchronization with the presentation of the programming content based on a determination that the content signal includes a trigger.

Thus, methods and systems for processing gaming data have been described. Although embodiments of the present invention have been described with reference to specific example embodiments, it will be evident that various modifications and changes may be made to these embodiments without departing from the broader spirit and scope of the embodiments of the invention. Accordingly, the specification and drawings are to be regarded in an illustrative rather than a restrictive sense.

The methods described herein do not have to be executed in the order described, or in any particular order. Moreover, various activities described with respect to the methods identified herein can be executed in serial or parallel fashion. Although "End" blocks are shown in the flowcharts, the methods may be performed continuously.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

What is claimed is:

1. A method comprising:
receiving a content signal from a signal source device at a mobile electronic device using a receiver of the mobile electronic device;
detecting, using a processor of the mobile electronic device, a trigger in the content signal that is received;
synchronizing presentation of a gaming application on a display of the mobile electronic device with a television game show that is broadcast and presented on the signal source device responsive to detection of the trigger at the mobile electronic device using gaming data that is stored in the mobile electronic device, gaming data that is received at the mobile electronic device, or gaming data that is both stored in the mobile electronic device and that is received at the mobile electronic device; and
receiving user input on the mobile electronic device during presentation of the gaming application to allow a user of the mobile electronic device to play the gaming application along with the presentation of the television game show.

2. The method of claim 1, wherein the trigger is a first trigger, wherein a first game of the gaming application is displayed as a first display responsive to detection of the first trigger, further comprising displaying a second game of the gaming application as a second display responsive to detection of a second trigger in the content signal.

3. The method of claim 2, further comprising displaying the first game and the second game on the display of the mobile electronic device.

4. The method of claim 1, further comprising synchronizing the gaming application with presentation of the television game show on the signal source device responsive to detection of the trigger in the content signal that is received.

5. The method of claim 1, wherein displaying the gaming application on the display of the mobile electronic device includes displaying the gaming application responsive to synchronizing the gaming application with the presentation of the television game show on the signal source device using the processor.

6. The method of claim 1, wherein the user is unable to play the gaming application on the mobile electronic device without viewing the television game show being presented on the signal source device.

7. The method of claim 1, further comprising determining, using the processor, whether the gaming data is associated with the gaming application.

8. The method of claim 1, further comprising displaying the gaming application in conjunction with the television game show being presented on the signal source device.

9. The method of claim 1, further comprising obtaining the gaming data using a network interface device of the mobile electronic device.

10. The method of claim 1, wherein the content signal is received by the mobile electronic device during the presentation of the television game show on the signal source device.

11. The method of claim 1, further comprising communicating the gaming data between a network interface device of the mobile electronic device and a server responsive to detecting the trigger.

12. The method of claim 1, further comprising presenting a promotional opportunity on the display of the mobile electronic device responsive to detecting the trigger.

13. The method of claim 1, wherein the content signal is an audio signal of the television game show that is presented on the signal source device.

14. The method of claim 1, wherein the content signal is a video signal of the television game show that is presented on the signal source device.

15. The method of claim 1, wherein the trigger is imperceptibly encoded in at least one of an audio signal or a video signal of the content signal.

16. A tangible and non-transitory computer readable storage medium comprising instructions that direct at least one processor of a mobile electronic device to:
   receive a content signal from a signal source device at a mobile electronic device using a receiver of the mobile electronic device;
   detect, using a processor of the mobile electronic device, a trigger in the content signal that is received;
   synchronize presentation of a gaming application on a display of the mobile electronic device with a television game show that is broadcast and presented on the signal source device responsive to detection of the trigger at the mobile electronic device using gaming data that is stored in the mobile electronic device, gaming data that is received at the mobile electronic device, or gaming data that is both stored in the mobile electronic device and that is received at the mobile electronic device; and
   receive user input on the mobile electronic device during presentation of the gaming application to allow a user of the mobile electronic device to play the gaming application along with the presentation of the television game show.

17. The tangible and non-transitory computer readable storage medium of claim 16, wherein the trigger is a first trigger, wherein a first game of the gaming application is displayed as a first display responsive to detection of the first trigger, further comprising displaying a second game of the gaming application as a second display responsive to detection of a second trigger in the content signal.

18. The tangible and non-transitory computer readable storage medium of claim 17, wherein the instructions also direct the at least one processor to:
   display the first game and the second game on the display of the mobile electronic device.

19. A method comprising:
   detecting, using a mobile electronic device, a trigger in a content signal that is received from a signal source device at a mobile electronic device using a receiver of the mobile electronic device;
   synchronizing a gaming application that is played on the mobile electronic device with a television show presented on the signal source device responsive to detection of the trigger at the mobile electronic device using data that is in the mobile electronic device; and
   receiving user input on the mobile electronic device during play of the gaming application on the mobile electronic device to allow a user of the mobile electronic device to play the gaming application along with presentation of the television show on the signal source device.

20. The method of claim 19, wherein the television show is a game show that one or more other users watch or listen to without playing the gaming application.

* * * * *